United States Patent [19]

Horihata et al.

[11] Patent Number: 4,713,672
[45] Date of Patent: Dec. 15, 1987

[54] LASER BEAM PRINTER

[75] Inventors: Katsushi Horihata, Osaka; Yoshizo Kawamori, Fujiidera, both of Japan

[73] Assignee: Mita Industrial Co., Ltd., Osaka, Japan

[21] Appl. No.: 887,175

[22] Filed: Jul. 17, 1986

[30] Foreign Application Priority Data

Jul. 24, 1985 [JP] Japan .................................. 60-163571

[51] Int. Cl.$^4$ .......................... G01D 9/42; G11B 7/00; H01S 3/00
[52] U.S. Cl. .................................... 346/108; 369/116; 346/160; 372/38
[58] Field of Search ................. 346/108, 107 R, 76 L, 346/160; 369/116; 358/296, 300, 285, 293; 372/38, 29, 31

[56] References Cited

U.S. PATENT DOCUMENTS 4,469,430 9/1984 Terashima ................................ 355/3
4,509,156 4/1985 Ohara .................................... 369/116

FOREIGN PATENT DOCUMENTS 63879 4/1982 Japan .
112089 7/1982 Japan .
136382 8/1982 Japan .
120663 6/1985 Japan .................................... 346/108

Primary Examiner—E. A. Goldberg
Assistant Examiner—Mark Reinhart
Attorney, Agent, or Firm—Stiefel, Gross, Kurland & Pavane

[57] ABSTRACT

In a laser beam printer wherein the quantity of light of the laser beam is fed back to maintain the light quantity at a constant value, the temperature sensor means is provided for detecting the temperature of the photosensitive member, and the feedback circuit is so constructed that the light quantity setting reference signal of the circuit is adjusted in accordance with the output of the temperature sensor means. Consequently, the quantity of light of the laser beam is adjusted according to the temperature-sensitivity characteristics of the photosensitive member to give a constant image density.

6 Claims, 19 Drawing Figures

LASER BEAM PRINTER

BACKGROUND OF THE INVENTION

1. Field of the Invention

The present invention relates to a laser beam printer, and more particularly a laser beam printer which can stabilize the images to be produced on a photosensitive member by a diode laser in accordance with image data.

2. Description of the Prior Art

The drive device for a diode laser used for a laser printer usually conducts optical modulation for the diode laser based on image signals representing character information or the like from an electronic computer, and the modulated beam is projected onto a photosensitive drum by scanning optical system to produce images on the drum according to the image signals (see, for example, U.S. Pat. No. 4,469,430).

The light output of the diode laser involves variations due to variations in the ambient temperature, adversely affecting the quality of images when the laser is used for laser printers or the like. To compensate for the output variations due to variations in the ambient temperature, it has been proposed to attach a Peltier element to a semiconductor laser to maintain the laser at a constant temperature (as disclosed, for example, in Unexamined Japanese Patent Publication SHO No. 57-63879), or to detect the light output of a diode laser and control the current through the laser based on the result so as to maintain a constant light output despite variations in the ambient temperature (e.g. Unexamined Japanese Patent Publications SHO No. 57-136382 and SHO No. 57-112089). However, the compensation achieved by these proposals is not fully satifactory.

Further with conventional laser printers, the sensitivity of the photosensitive member to be exposed to the laser beam for writing varies with the ambient temperature. Consequently, even if it is possible to maintain the light output of the diode laser at a constant value, the density of images on the photosensitive member varies with variations in the ambient temperature and cannot be maintained at a predetermined level. The prior art nevertheless is still unable to solve this problem.

SUMMARY OF THE INVENTION

The present invention provides a laser beam printer comprising a beam source in the form of a diode laser, a rotary polygonal mirror rotatable at a constant speed for reflecting a beam from the beam source, a photosensitive member to be scanned by the beam reflected from the rotary polygonal mirror, means for detecting the quantity of light of the beam from the beam source, means for amplifying the output of the light quantity detecting means, means for sampling the output of the amplifying means, temperature sensor means for detecting the temperature of the photosensitive member, means for producing a reference signal as adjusted by the output of the temperature sensor means, means for calculating the difference between the reference signal and the sampled signal, means for adjusting the current to be passed through the diode laser in accordance with the calculated difference, beam sensor means for detecting the beam from the rotary polygonal mirror to produce a horizontal synchronizing signal, means for switching the current through the diode laser, and control means for receiving image data and the horizontal synchronizing signal to drive the switching means.

The temperature sensor means is preferably a thermistor but can be a thermocouple in some cases.

The temperature sensor means is desirably positioned in the closest proximity to the photosensitive member, and may be in some cases made in slidable contact with the photosensitive member.

One embodiment of the present invention is that of a laser beam printer wherein the quantity of light of the laser beam is fed back to maintain the light quantity at a constant value, the temperature sensor means is provided for detecting the temperature of the photosensitive member as stated above, and the feedback circuit is so constructed that the light quantity setting reference signal of the circuit is adjusted in accordance with the output of the temperature sensor means. Consequently, the quantity of light of the laser beam is adjusted according to the temperature-sensitivity characteristics of the photosensitive member to give a constant image density.

Preferably, the control means comprises a processing circuit for producing a horizontal synchronization detecting signal to operate the diode laser and obtain the horizontal synchronizing signal, for feeding a sampling instruction signal A to the sampling means when producing the horizontal synchronization detecting signal and for receiving the horizontal synchronizing signal from the beam sensor means to assure a data signal to be sent to the diode laser of horizontal synchronism, and an interface for feeding a sampling instruction signal B to the sampling means when the data signal includes at least a predetermined number of diode laser operating signal portions in succession.

Through the operation of the control means thus designed, the quantity of light of the diode laser is sampled and fed back also during the period in which the diode laser is driven by image data, with the result that the frequency of sampling per scanning traverse period increases to control the quantity of light of the laser with improved accuracy.

Preferably, the laser beam printer further comprises comparison means for comparing the output of the amplifying means with a predetermined value to produce an output when the output of the amplifying means is in excess of the predetermined value, and means for stopping the current through the diode laser in response to the input from the comparison means.

The amplifying means may comprise two amplifying circuits individually adjustable in the degree of amplification, i.e., gain.

DESCRIPTION OF THE PREFERRED EMBODIMENTS

Figure 1:
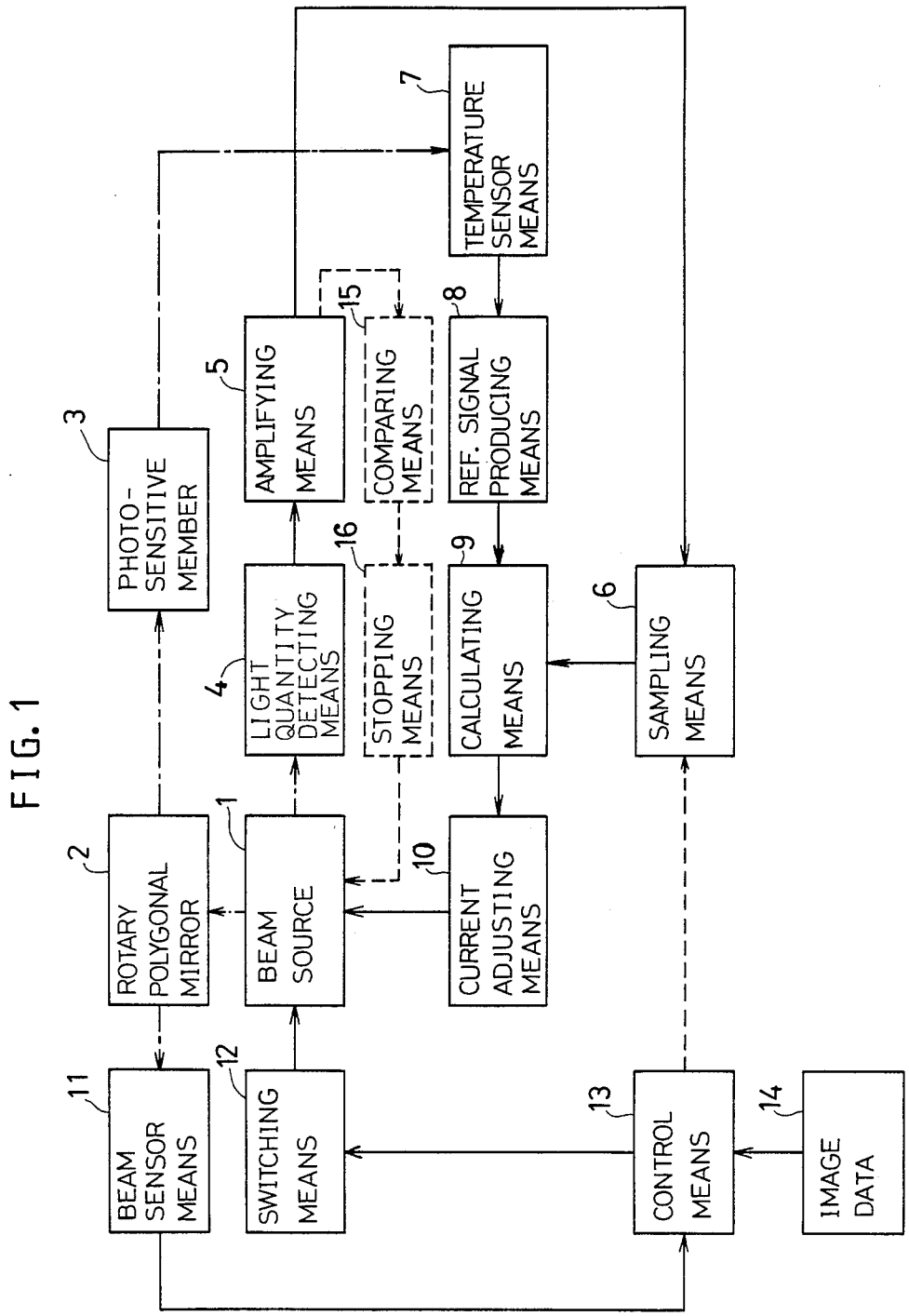
FIG. 1 is a block diagram showing an embodiment of the present invention.

FIG. 1 is a block diagram showing an embodiment of the present invention. The diagram shows a beam source 1 comprising a diode laser, rotary polygonal mirror 2 rotatable at a constant speed for reflecting a beam from the beam source 1, a photosensitive member 3 to be scanned by the beam reflected from the mirror 2, means 4 for detecting the quantity of light of the beam from the beam source 1, means 5 for amplifying the output of the light quantity detecting means 4, means 6 for sampling the output of the amplifying means 5, temperature sensor means 7 for detecting the temperature of the photosensitive member 3, means 8 for producing a reference signal as adjusted by the output of the temperature sensor means 7, means 9 for calculating the difference between the reference signal and the sampled signal, means 10 for adjusting the current to be passed through the diode laser in accordance with the calculated difference, beam sensor means 11 for detecting the beam from the mirror 2 to produce a horizontal synchronizing signal, means 12 for switching the current through the diode laser, control means 13 for receiving image data 14 and the horizontal synchronizing signal and controlling the period of switching by the switching means 12 and the period of sampling by the sampling means 6, comparison means 15 for comparing the output of the amplifying means 5 with a predetermined value to produce an output when the output of the amplifying means 5 is in excess of the predetermined value, and means 16 for stopping the current through the diode laser in response to the input from the comparison means 15.

Figure 2:
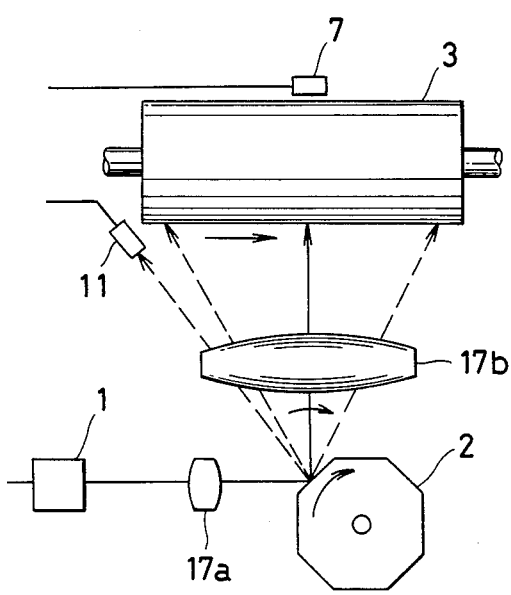
FIG. 2 is a diagram schematically showing a scanning system for use in the laser beam printer of the present invention.

FIG. 2 shows a system included in the laser beam printer for scanning the photosensitive member 3 by the beam source 1. The laser beam from the beam source 1 is collimated by a collimator 17a, reflected by the rotary polygonal mirror 2 and scans the member 3 upon passing through a collimator 17b. The beam sensor means 11 is disposed in the vicinity of one end of the member 3 at one side thereof for obtaining a horizontal synchronizing signal. The temperature sensor means 7 for detecting the temperature of the member 3 is provided close to the midportion of the member 3. The construction, as well as the operation, of the scanning system is well known and therefore will not be described in detail.

Figure 3:
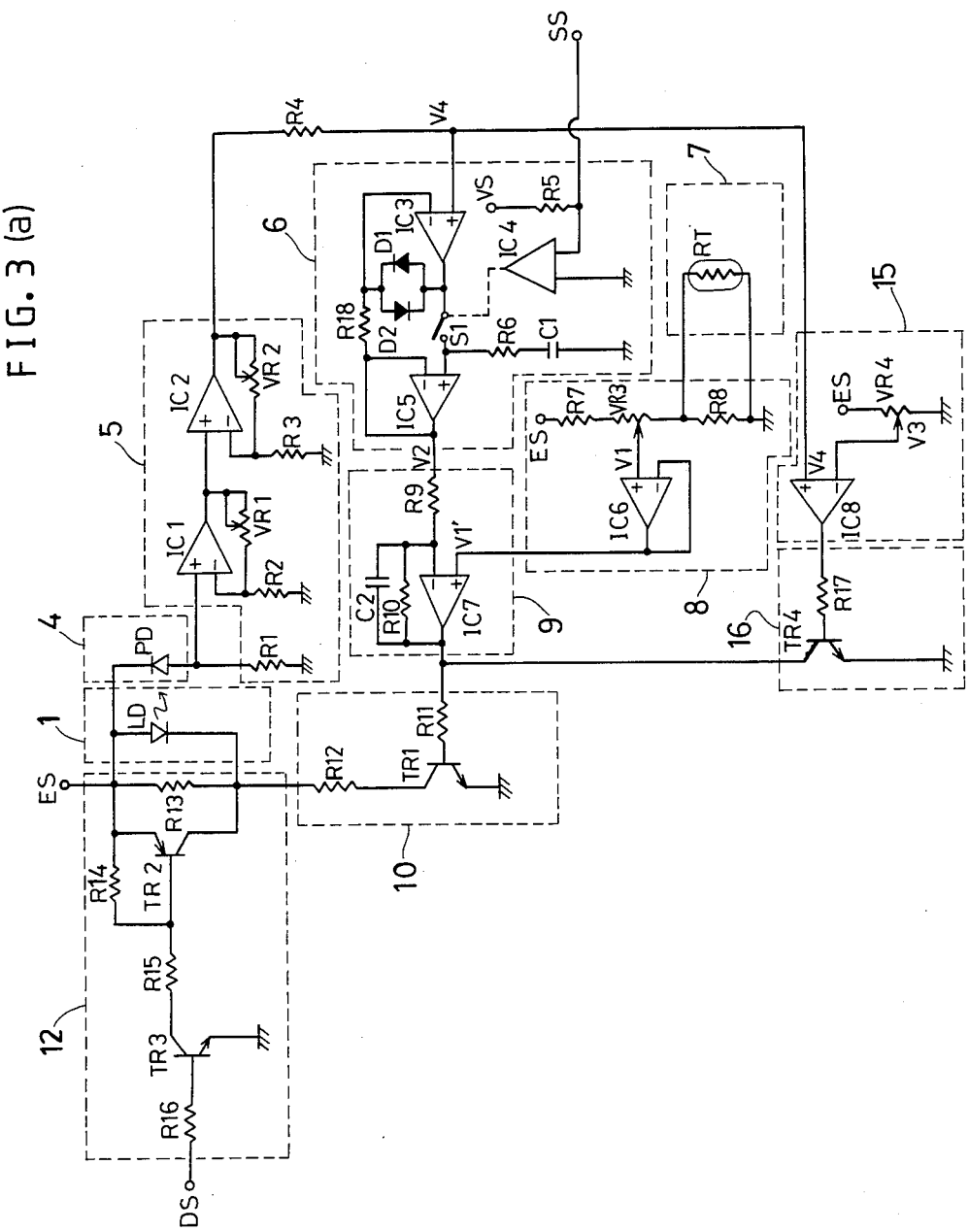
FIGS. 3(a) and 3(b) are electric circuit diagrams corresponding to FIG. 1.
Figure 3B:
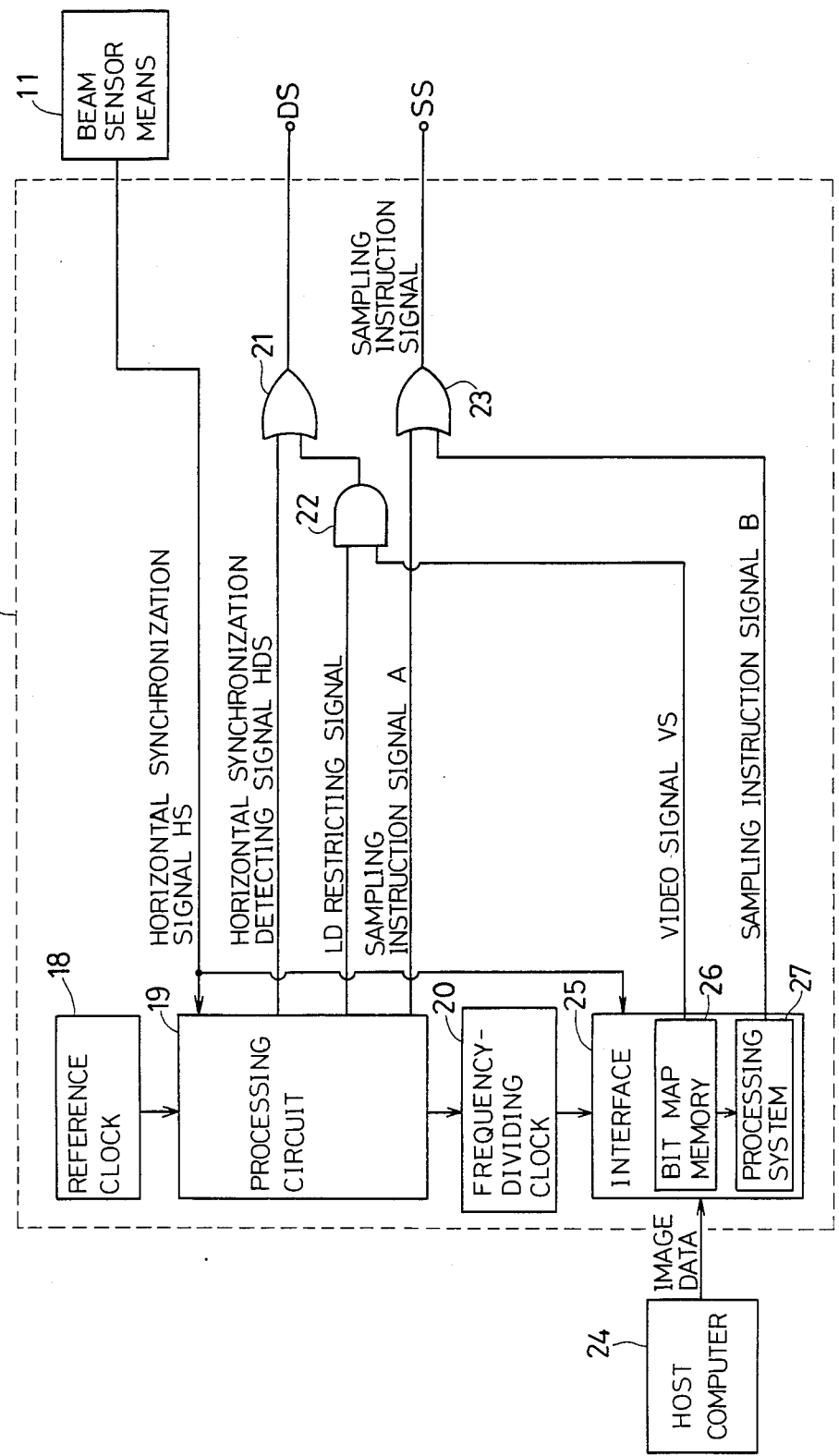

FIGS. 3(a) and 3(b) are electric circuit diagrams showing the present embodiment in corresponding relation to the block diagram of FIG. 1. In this case, the sensitivity characteristics of the photosensitive member 3 are positive with respect to the temperature.

With reference to FIG. 3(a), indicated at LD is the diode laser constituting the beam source 1. The light quantity detecting means 4 comprises a photodiode PD for receiving a portion of the light output of the diode laser LD. Indicated at ES is a power supply voltage terminal. The amplifying means 5 comprises a resistor R1 for detecting the monitoring current of the photodiode PD, operational amplifiers IC1 and IC2 for amplifying the output of the photodiode PD, input resistors R2 and R3 for the operational amplifiers IC1, IC2, and variable resistors VR1, VR2 for adjusting the gain of the amplifiers IC1, IC2, respectively. The sampling means 6, which is a sampling and holding circuit, comprises an input buffer operational amplifier IC3 for receiving the output of the amplifier IC2 via a resistor R4, clamp diodes D1, D2, a switching operational amplifier IC4 for operating an analog switch S1 in response to a sampling instruction signal SS, an operational amplifier IC5 constituting an integrator along with a holding capacitor C1 and resistor R6, a feedback resistor R18 and a resistor R5 for holding the input of the amplifier IC4. The temperature sensor means 7 comprises a thermistor RT disposed close to the photosensitive member 3 for detecting the temperature of the member 3. Indicated at R7 is a resistor, at VR3 a variable resistor for dividing the voltage at the power supply voltage terminal ES to set a reference voltage V1, at R8 a correction resistor connected to the thermistor RT for varying the reference voltage V1 in accordance with the resistance value of the thermistor RT and correcting the resistance-temperature characteristics of the thermistor RT, and at IC6 a voltage follower operational amplifier. These elements constitute the reference signal producing means 8 for producing a reference voltage V1' according to the temperature of the member 3 detected by the thermistor RT. The calculating means 9 comprises an operational amplifier IC7 for calculating the difference between the reference voltage V1' delivered from the amplifier IC6 and a sampling voltage V2 produced by the amplifier IC5, amplifying resistors R9, R10 and a stabilizing capacitor C2. The current adjusting means 10 comprises a transistor TR1 connected to the diode laser LD via a current-limiting resistor R12 for adjusting the current for driving the laser LD, and a base resistor R11 for connecting the output of the operational amplifier IC7 to the base of the transistor TR1. The switching means 12 comprises a transistor TR2 connected in parallel with the diode laser LD for bypassing the current to be fed to the diode laser LD, a transistor TR3 for controlling the transistor TR2 according to a diode laser drive signal DS to turn on or off the diode laser LD, a resistor R13 connected in parallel with the diode laser LD, a bias resistor R14 and a base resistor R15 for the transistor TR2, and a base resistor R16 for the transistor R3. The stopping means 16 comprises a transistor TR4 connected to the transistor TR1 for bypassing the base current thereof to stop the current for the diode laser LD, and a base resistor R17 for the transistor TR4. The comparing means 15 comprises a variable resistor VR4 for dividing the voltage at the power supply voltage terminal ES for giving an adjustable constant voltage V3, and a comparator IC8 for conducting the transistor TR4 when the output V4 of the operational amplifier IC2 exceeds the constant voltage V3.

With reference to FIG. 3(b), the control means 13 comprises a processing circuit 19 for receiving a signal from a reference clock 18 and a horizontal synchronizing signal HS from the beam sensor means 11 for detecting the output beam of the diode laser LD, a frequency-dividing clock 20 receiving an output from the circuit 19, and an OR gate 21, AND gate 22 and OR gate 23 for producing outputs on receiving outputs from the circuit 19. The processing circuit 19 feeds to the OR gate 21 a horizontal synchronization detecting signal HDS for turning on the diode laser LD for a specified period to obtain the horizontal synchronizing signal HS. While the signal HDS is at a high level, the circuit 19 also feeds to the OR gate 23 a sampling instruction signal A for instructing a sampling period. The circuit 19 further feeds to the AND gate 22 an LD restricting signal for restricting the output region of the diode laser LD to a suitable range so that the video signal to be described below will not be applied to the nonimage area, the restricting signal being produced in a given relation to the horizontal synchronizing signal HS. The signal HS is used for assuring the laser printer and the interface 25 to be described below of horizontal synchronism (beam scan direction).

Indicated at 24 is a host computer for producing image data signals, and at 25 an interface for receiving the image data signal from the host computer 24, the horizontal synchronizing signal HS and an output from the frequency-dividing clock 20. The interface 25 has a bit map memory 26 to which image data is fed from the host computer 24. The data in the memory 26 is sent as a video signal VS to the laser beam printer as timed by clock pulses. Furthermore, data newly prepared by a processing system 27 from the content of the memory 26 is sent as a sampling instruction signal B to the printer as timed by carrier clock pulses. That is, the video signal VS is fed to the AND gate 22, and the sampling instruction signal B is fed to the OR gate 23. The AND gate 22 produces an AND output from the LD restricting signal and the video signal VS. From the AND output and the horizontal synchronization detecting signal HDS, the OR gate 21 produces an OR output, i.e., an LD output signal, which is fed to the switching means 12. The OR gate 23 prepares an OR output from the sampling instruction signal A and the sampling instruction signal B, i.e., a sampling instruction signal SS, which is fed to the sampling means 6. The sampling instruction signal B is prepared from sampling instruction data which is prepared when at least a predetermined number of "1" bits, i.e. high signal portions, are present in succession in the bit map memory 26, that is, while image data is present to continuously hold the diode laser LD on. The signal B is forwarded to the laser beam printer in synchronism with the video signal VS.

While the most preferred embodiment of the present invention has been described above, the main object of the invention can be fulfilled even when the comparison means 15, the stopping means 16 (FIGS. 1 and 3(a)) and the processing system 27 (FIG. 3(b)) are omitted.

Figure 4:
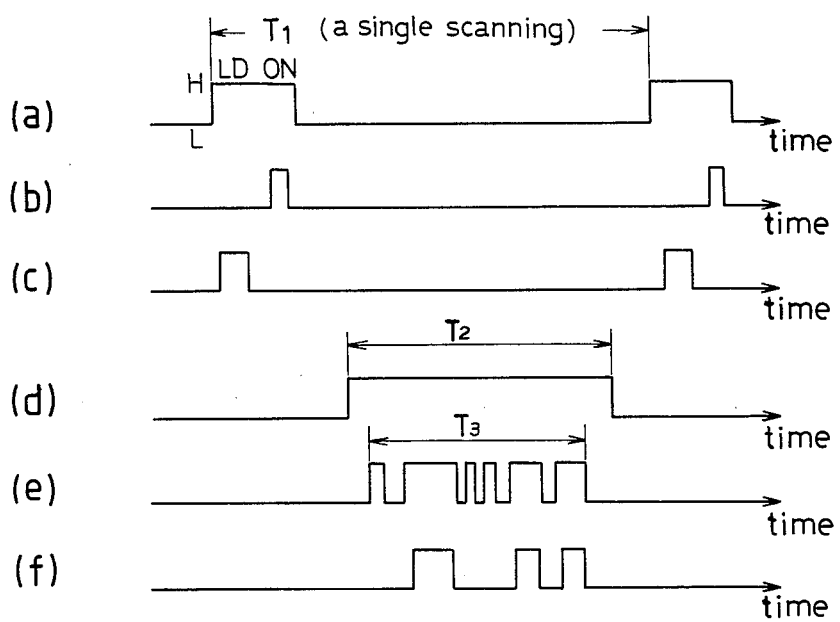
FIGS. 4 (a to f) 5(a to c), and 6(a to e) are time charts showing signals produced in the circuits of FIGS. 3(a) and 3(b)
Figure 5:
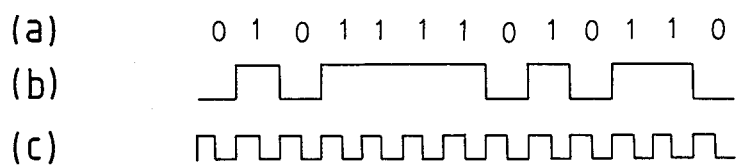
Figure 6:
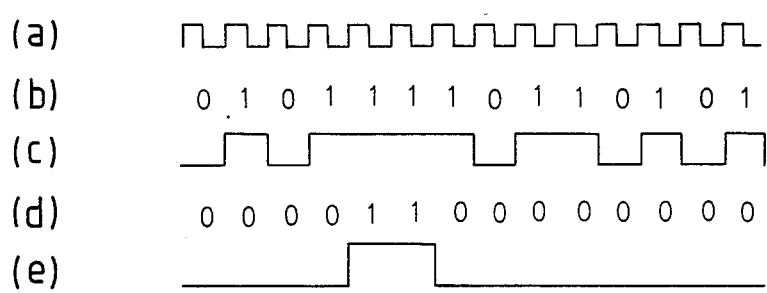

FIGS. 4 to 6 are time charts of various signals for illustrating the operation of the present embodiment. With reference to FIG. 4, indicated at (a) is the horizontal synchronization detecting signal HDS emitted by the processing circuit 19. It is seen that the signal HDS is at a high level for a suitable specified period of time to hold the diode laser on to obtain the horizontal synchronizing signal HS, indicated at (b), from the beam sensor means 11. T1 is the duration of one scanning traverse. Indicated at (c) is the sampling instruction signal A produced by the circuit 19 while the signal HDS is at a high level. FIG. 4(d) shows the LD restricting signal produced in a specified relation with the horizontal synchronizing signal HS. T2 represents a period of time taken for a single scanning traverse over a distance corresponding to the width of paper (not shown) to which the image formed on the photosensitive member 3 is to be transferred. FIG. 4(e) shows the video signal VS delivered from the interface 25. T3 represents a period of time taken for a single scanning traverse over the image area. Indicated at (f) is the sampling instruction signal B prepared by the interface 25. As already described, this signal is given when the video signal remains at a high level at least for a predetermined period of time.

FIG. 5 shows the video signal VS prepared by the interface 25, (a) showing image data represented by bits, (b) showing the video signal VS and (c) showing carrier clock pulses.

FIG. 6 shows that the processing system 27 provides the sampling instruction signal B, (a) showing carrier clock pulses, (b) image data, (c) video signal VS, (d) sampling instruction data, and (e) sampling instruction signal B. It is seen that when "1" bits are present in succession (at least four 1's in the diagram), i.e., while the signal VS remains at a high level, in the bit map memory 26, the processing system 27 converts "1,1,1,1" to "0,1,1,0" which is sampling instruction data. The sampling instruction signal B is prepared from this data.

The optical output of the diode laser LD is detected by the photodiode PD, amplified by the operational amplifiers IC1, IC2 and fed to the operational amplifier IC3 of the sampling and holding circuit 6. The sampling instruction signal SS obtained as an output from the OR gate 23 to which the sampling instruction signal A and the sampling instruction signal B are given is delivered to the operational amplifier IC4, which in turn closes the switch S1 only for a sampling period, causing the capacitor C1 to hold a sampling voltage V4 based on the monitoring current from the photodiode PD.

The held voltage is delivered as a voltage V2 to the calculating means 9, in which the voltage is compared with a reference voltage V1' from the reference signal producing means 8. The transistor TR1 is driven based on the resulting voltage difference. Thus, the current adjusting means 10 controls the drive current for the diode laser LD. On the other hand, the diode laser LD is on-off controlled according to the LD output signal DS from the OR gate 21. Stated more specifically, the diode laser LD is controlled by the transistor TR2, while the base of the transistor TR2 is connected to the collector of the transistor TR3 operated by the LD output signal DS, so that the transistor TR2 is operated according to the on-off state of the transistor TR3.

In this way, the optical output of the diode laser LD is fed back to the transistor TR1 for controlling the laser driving current, every time the sampling instruction signal SS is produced, whereby the optical output is maintained at a constant level despite variations in the ambient condition.

According to the present invention, the light output of the diode laser is stabilized by sampling the monitoring current in response to sampling signals SS, i.e., both the sampling instruction signal A produced between scanning traverses when the horizontal synchronization detecting signal HDS is at a high level and the sampling instruction signal B produced during the scanning traverse when the video signal VS remains at a high level at least for a specified period of time. Consequently, even if an incorrect sampling voltage is accepted in response to the sampling instruction signal A, the sampling voltage will be corrected when the sampling instruction signal B is emitted during the scanning traverse. This contributes to an improvement in the quality of images.

Figure 7:
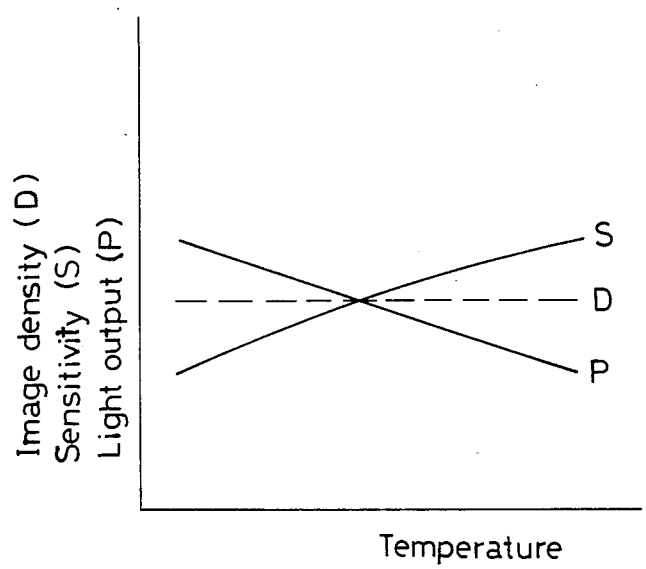
FIG. 7 is a characteristics diagram of the embodiment of the present invention showing the sensitivity of the photosensitive member, the image density thereon and the light output of the diode laser at varying temperatures.

FIG. 7 shows the characteristics of the present embodiment with respect to the sensitivity S of the photosensitive member 3, the light output P of the diode laser and the image density D at varying temperatures.

When the sensitivity S of the member 3 has positive temperature characteristics, the sensitivity S increases with a rise of temperature as shown in FIG. 7. This is detected by the thermistor RT disposed in the vicinity of the photosensitive member 3. Since the thermistor RT has negative temperature characteristics, the resistance thereof decreases as the temperature rises, giving a reduced reference voltage V1. This lowers the base current for the transistor TR1, lowering the current for driving the diode laser LD to result in a reduced light output P. As seen in FIG. 7, therefore, even if the sensitivity S of the photosensitive member 3 increases with a rise of temperature, the light output P of the diode laser decreases, with the result that the image density D on the photosensitive member is maintained approximately at a constant level irrespective of the temperature. The correction resistor R8 is used to match the degree of temperature compensation by the thermistor RT with the temperature characteristics of the sensitivity S of the photosensitive member.

Although the present embodiment has been described in the case where the sensitivity of the photosensitive member 3 has positive temperature characteristics as shown in FIG. 7, the image density D can be maintained at a constant value despite variations in the temperature of the member 3 when the sensitivity S has negative temperature characteristics, by replacing the thermistor RT of FIG. 3(a) by a resistance element having positive temperature characteristics.

When the laser beam printer is to be initiated into operation or brought into operation again after an interruption, the sample holding value of the capacitor C1 is zero or nearly zero, so that the moment when the switch S1 closes in response to a sampling instruction signal SS given to the sampling means 6, the operational amplifier IC7 of the calculating means 9 produces a "high" output, bringing the transistor TR1 into conduction. Consequently, the output of the diode laser LD abruptly increases and is likely to exceed the permissible maximum. Simultaneously with this, the sample voltage V4 increases. When the sample voltage V4 exceeds the reference voltage V3 at the comparator IC8 of the comparison means 15, the comparator IC8 delivers a "high" output to bring the transistor TR4 into conduction and the transistor TR1 out of conduction. As a result, the output of the diode laser LD lowers without exceeding the permissible maximum. In this way, the diode laser is controlled to a definite output and protected from overcurrent. Accordingly, when the reference voltage V3 afforded by the variable resistor VR4 is preset, for example, to about 80% of the maximum output of the diode laser LD, the breakdown of the diode laser LD can be reliably precluded.

The conventional means corresponding to the amplifying means 5 comprises a single operational amplifier which is provided with two variable resistors, one at the inverted input side thereof and the other at the non-inverted input side, for adjusting the light output of the diode laser. Accordingly, if the characteristics of the diode laser involve variations, the former variable resistor is adjusted. This alters the operating charactersitics of the amplifier, so that the other variable resistor also needs adjustment. Further, since the single amplifier is used, the gain thereof, when increased, permits the circuit to develop abnormal oscillation or like trouble. Consequently, the variable resistors are unable to adjust the output voltage over a wide range and encounter difficulties in adjusting the light output.

According to the present embodiment, however, variations in the light output of the diode laser LD due to variations in the operating characteristics of the diode laser LD are correctable by the variable resistor VR1, and the light output of the diode laser LD is adjustable by the variable resistor VR2.

Thus, the adjustment of the characteristics of the diode laser and the adjustment of the light output of the diode laser can be made separately. This assures simplified adjustment during use or manufacture, further rendering diode lasers of like standard or those of a different standard similarly usable through the above adjustment for wider application.

Further, according to the invention, the light output of the diode laser is amplified in two stages, i.e., by the amplifier IC1 and the amplifier IC2, and the variable resistors VR1 and VR2 are used respectively for adjusting the gain. The amplifiers IC1, IC2 can therefore be operated within the range of low gains, are less likely to cause abnormal oscillation and ensure stabilized operation of the circuit.

What is claimed is:

1. A laser beam printer comprising:
   a. a beam source comprising a diode laser,
   b. a rotary polygonal mirror rotatable at a constant speed for reflecting a beam from the beam source,
   c. a photosensitive member to be scanned by the beam reflected from the rotary polygonal mirror,
   d. means for detecting the quantity of light of the beam from the beam source,
   e. means for amplifying the output of the light quantity detecting means,
   f. means for sampling the output of the amplifying means,
   g. temperature sensor means for detecting the temperature of the photosensitive member,
   h. means for producing a reference signal as adjusted by the output of the temperature sensor means,
   i. means for calculating the difference between the reference signal and the sampled signal,
   j. means for adjusting the current to be passed through the diode laser in accordance with the calculated difference,
   k. beam sensor means for detecting the beam from the rotary polygonal mirror to produce a horizontal synchronizing signal,
   l. means for switching the current through the diode laser, and
   m. control means for receiving image data and the horizontal synchronizing signal to drive the switching means.

2. A laser beam printer as defined in claim 1 wherein the temperature sensor means (g) comprises a thermistor.

3. A laser beam printer as defined in claim 1 wherein the temperature sensor means (g) is disposed in the vicinity of the photosensitive member.

4. A laser beam printer as defined in claim 1 wherein the control means (m) comprises a processing circuit for producing a horizontal synchronization detecting signal to operate the diode laser and obtain the horizontal synchronizing signal, for feeding a sampling instruction signal A to the sampling means when producing the horizontal synchronization detecting signal and for receiving the horizontal synchronizing signal from the beam sensor means to assure a data signal to be sent to the diode laser of horizontal synchronism, and an interface for feeding a sampling instruction signal B to the sampling means when the data signal includes at least a predetermined number of diode laser operating signal portions in succession.

5. A laser beam printer as defined in claim 1 wherein the amplifying means (e) comprises two amplifying circuits individually adjustable in gain.

6. A laser beam printer comprising:
a. a beam source comprising a diode laser,
b. a rotary polygonal mirror rotatable at a constant speed for reflecting a beam from the beam source,
c. a photosensitive member to be scanned by the beam reflected from the rotary polygonal mirror,
d. means for detecting the quantity of light of the beam from the beam source,
e. means for amplifying the output of the light quantity detecting means,
f. means for sampling the output of the amplifying means,
g. temperature sensor means for detecting the temperature of the photosensitive member,
h. means for producing a reference signal as adjusted by the output of the temperature sensor means,
i. means for calculating the difference between the reference signal and the sampled signal,
j. means for adjusting the current to be passed through the diode laser in accordance with the calculated difference,
k. beam sensor means for detecting the beam from the rotary polygonal mirror to produce a horizontal synchronizing signal,
l. means for switching the current through the diode laser,
m. control means for receiving image data and the horizontal synchronizing signal to drive the switching means,
n. means for comparing the output of the amplifying means with a predetermined value to produce an output when the output of the amplifying means is in excess of the predetermined value, and
o. means for stopping the current through the diode laser in response to the input from the comparison means.

* * * * *